Aug. 11, 1970                J. E. WALDRUM                3,523,646
                    LIQUID SPRAYER AND METHOD OF SPRAYING
Filed Aug. 28, 1968                                   5 Sheets-Sheet 1
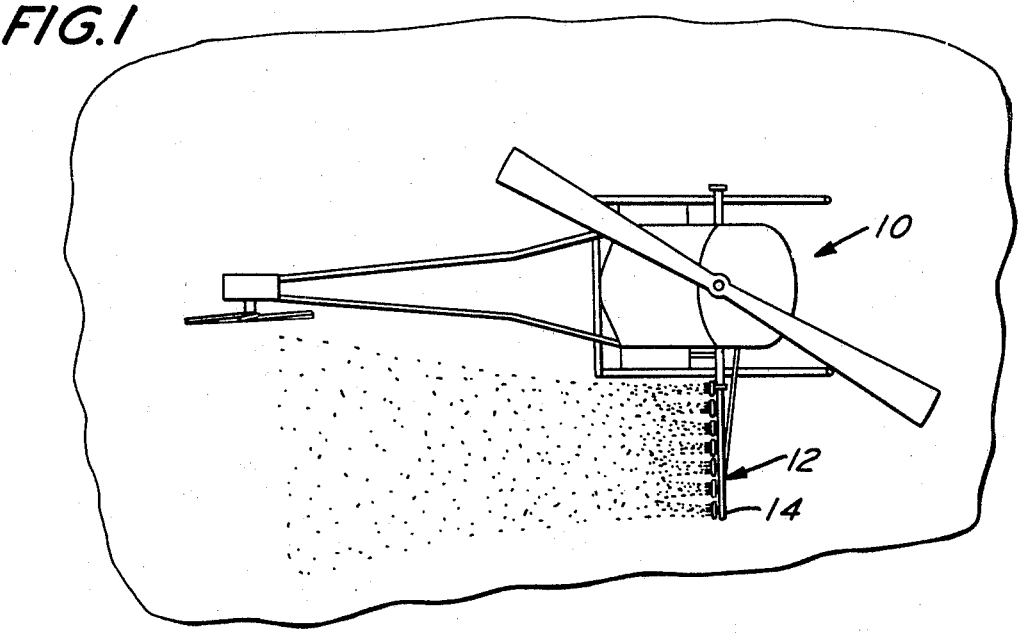
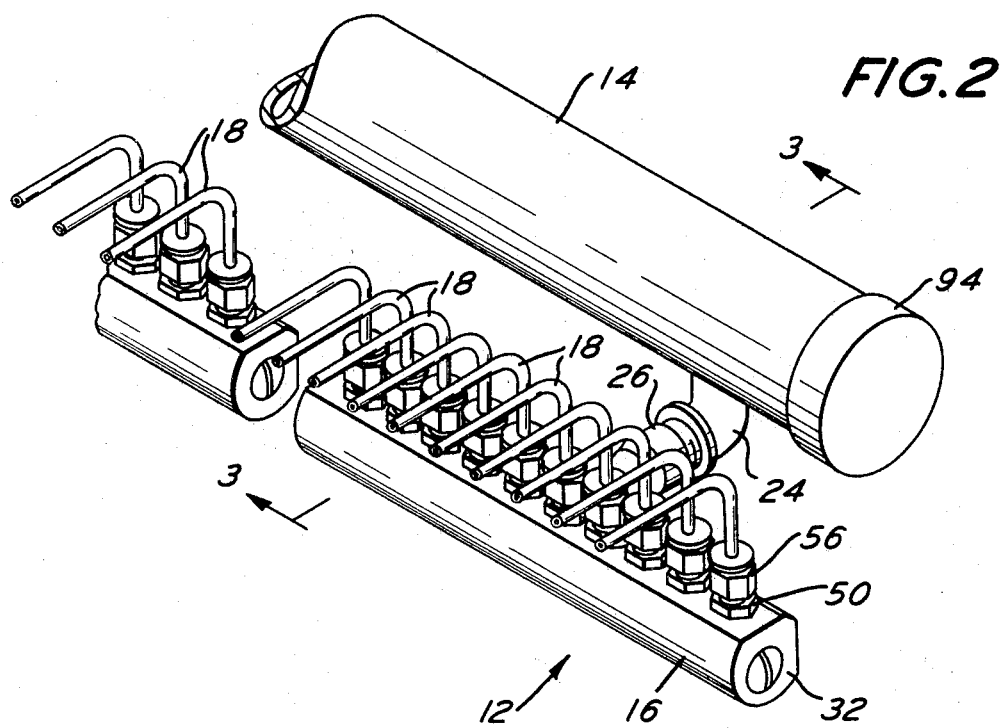
INVENTOR
JOHN E. WALDRUM
BY
Caesar, Rivise,
Bernstein & Cohen
ATTORNEYS.

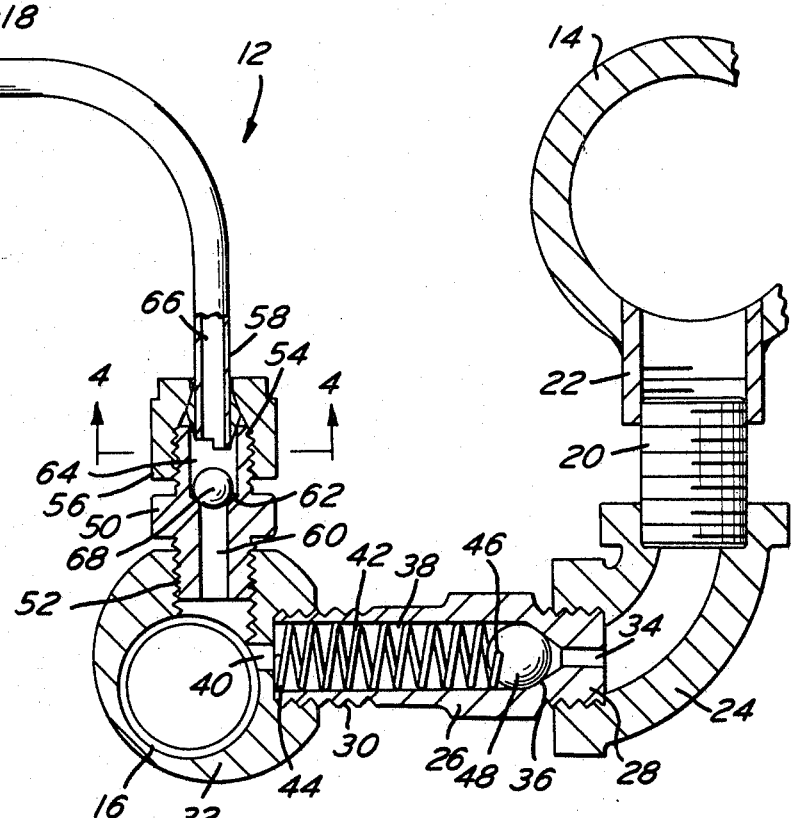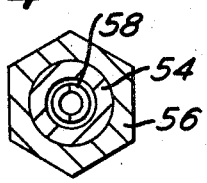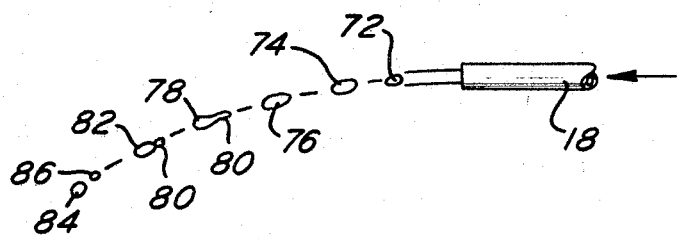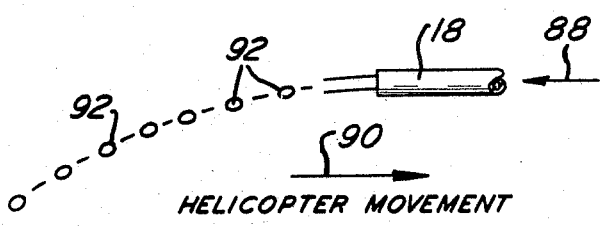

Aug. 11, 1970     J. E. WALDRUM     3,523,646

LIQUID SPRAYER AND METHOD OF SPRAYING

Filed Aug. 28, 1968     5 Sheets-Sheet 3

INVENTOR
JOHN E. WALDRUM
BY
Caesar, Rivise,
Bernstein & Cohen
ATTORNEYS.

Aug. 11, 1970   J. E. WALDRUM   3,523,646
LIQUID SPRAYER AND METHOD OF SPRAYING
Filed Aug. 28, 1968   5 Sheets-Sheet 4
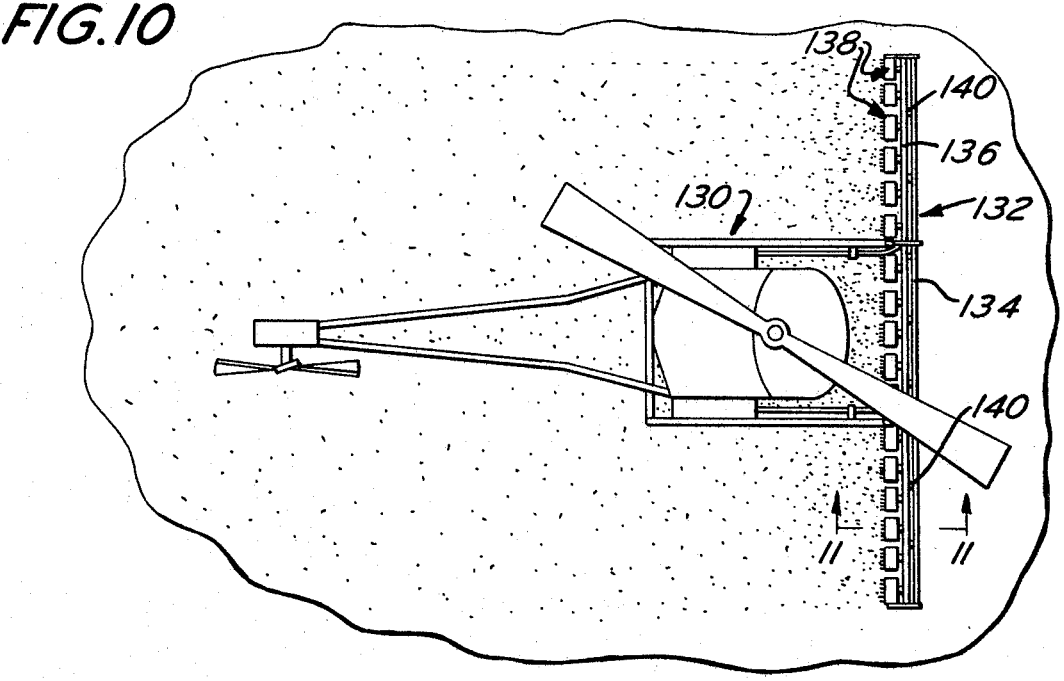
FIG. 10
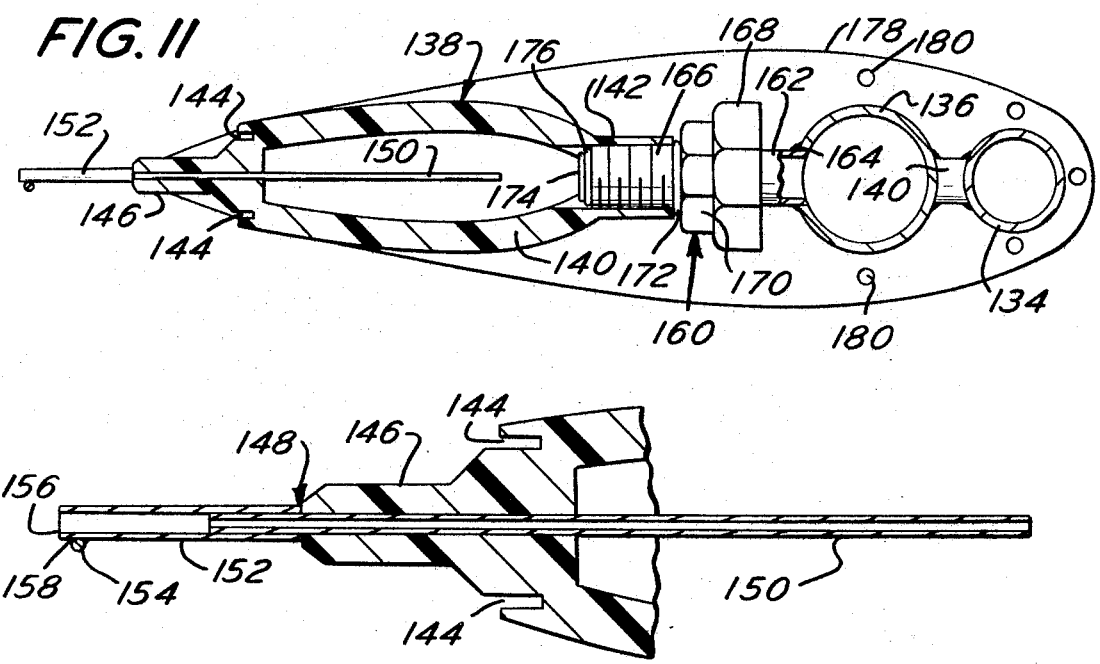
FIG. 11
FIG. 12
INVENTOR
JOHN E. WALDRUM
BY
Caesar, Rivise,
Bernstein & Cohen
ATTORNEYS.

INVENTOR
JOHN E. WALDRUM
BY
Caesar, Rivise,
Bernstein & Cohen
ATTORNEYS.

United States Patent Office 3,523,646
Patented Aug. 11, 1970

3,523,646
LIQUID SPRAYER AND METHOD OF SPRAYING
John E. Waldrum, Ambler, Pa., assignor to Amchem Products, Inc., Ambler, Pa., a corporation of Delaware
Continuation-in-part of application Ser. No. 558,539, May 31, 1968. This application Aug. 28, 1968, Ser. No. 756,040
Int. Cl. B05b 17/02
U.S. Cl. 239—171                              15 Claims

ABSTRACT OF THE DISCLOSURE

A uniform sprayer involving a movable nozzle to which a liquid supply is led and discharged therefrom in laminar flow, with the direction of discharge being substantially opposite to the direction of nozzle movement, such that the discharge stream breaks up into relatively large droplets of substantially uniform size. It is to be noted that the discharge stream will be initiated at a point sufficiently away from any portion of the apparatus with which it is associated so that the discharge stream is not impeded by air turbulence or low pressure air pockets. A similar consideration applies to the method of the present invention.

---

Figure 7:
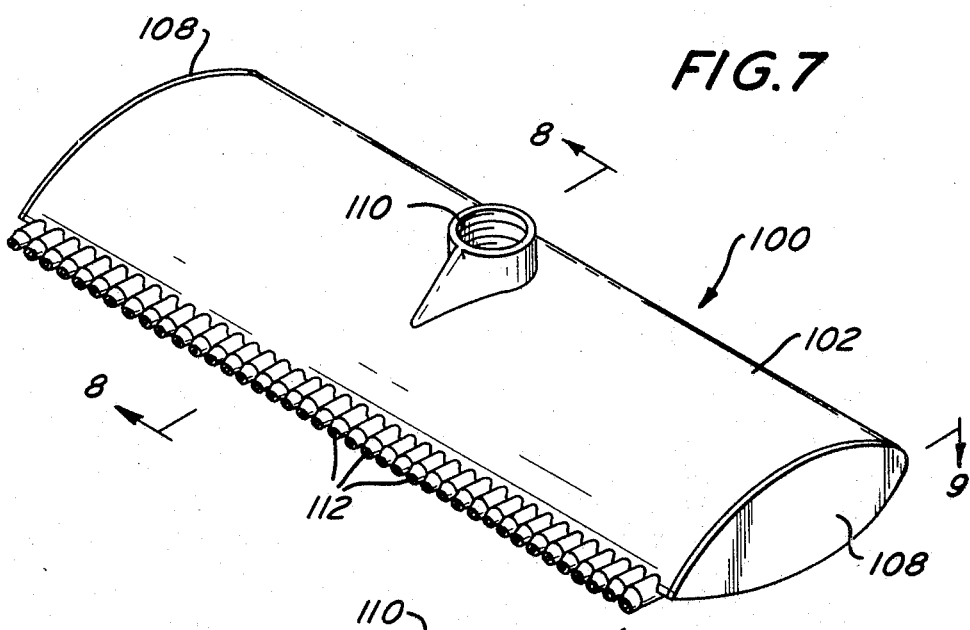

This application is a continuation-in-part application based on co-pending application Ser. No. 558,539, filed May 31, 1966, now Pat. No. 3,445,065 and entitled "Uniform Sprayer."

The method of the present invention involves the steps of providing a system moving in a first direction, providing a supply of liquid, discharging the liquid in laminar flow in a direction substantially opposite to said first direction to produce a discharge stream that breaks up into relatively large droplets of substantially uniform size, and there should be no impedance or distortion from air turbulence or pockets.

In another form of the invention the sprayer has a hollow body with means to supply a liquid to the hollow body, and a plurality of nozzles projecting from the hollow body. The nozzles each comprise a capillary tube extending from the hollow body in fluid communication with the liquid and there is a spray tube coaxial with the capillary tube which projects outwardly from the hollow body, the spray tube being in fluid communication with said capillary tube. In this form of the invention the liquid flow through the capillary tubes is also in laminar flow.

There is also provided as yet another aspect of the invention, a fine wire which bridges the spray tubes and is secured in place adjacent the orifices of said spray tubes. The wire causes any liquid remaining in the spray tubes, after the dispensing of the liquid through the spray tubes has been terminated, to be drawn into large droplets from the spray tubes, which droplets are immediately dispensed from the wire.

This invention relates to several forms of a uniform sprayer, and more particularly, to a spray device that is adapted for use with aerial and in some instances ground spraying operations, as it is also adapted to be utilized with lawn equipment. The invention also contemplates a method as will be discussed hereinafter.

The problem of "drift" is well known in connection with the application of systemic herbicides. The powerful properties of a systemic herbicide are such that a few droplets of the systemic herbicide are sufficient to kill a plant. While systemic herbicides are selective, such herbicides will attack certain economic crops. The problem of drift arises during the spraying operation because of uncertain winds, drafts, etc. which will at times displace or modify the movement of the herbicide droplets and cause the same to be carried to unwanted areas.

A considerable number of solution to the problem of drift have been heretofore suggested and have met with varying degrees of success. One proposal involves a utilization of a very heavy invert herbicide emulsion with the expectation that only large heavy droplets will be formed during spraying which are not easily influenced by external forces. However, the preparation and spraying of invert emulsions involves time and otherwise adds expense to the spraying operation.

It is recognized that the problem of drift is particularly acute when many fine droplets are produced in the spraying operation. The fine droplets are more easily carried away and are dispensed a greater distance by cross-winds than the larger droplets, as noted in the Handbook on Aerial Application in Agriculture (December 1956) published by the A & M College of Texas, College Station, Tex.

The problem is particularly set forth on pages 54 and 55 of said handbook which discusses the desirability of shortening the time in which the droplets are in the air in order to decrease the probability of the droplets being swept away by a cross-wind. The handbook goes on to suggest the desirability of having spray devices that will produce substantially uniform droplet sizes. However, the spray devices either currently in use or that have been suggested seem always to produce enough fine particles so that the problem of drift remains ever present.

It is also known that when a liquid under pressure is discharged in a laminar stream from a stationary nozzle, the droplets formed from the emerging stream tend to subdivide into a primary droplet and at a smaller satellite drop which forms primarily behind the primary droplet. In the aforesaid formation process, the complex stresses as explained by the principles of fluid dynamics acting upon the droplet, tend to exert a stretching action on the droplet, especially as the vertical component of fall becomes more permanent and the horizontal component of spray discharge becomes less significant.

The droplets thus begin to possess a backward tail which quickly severs itself from the remainder of the droplet under the further downward pull of gravity to become the satellite droplet. The satellite droplets are considerably smaller than the primary droplets and thus the satellite droplets are in effect fine droplets which would tend easily to drift. One solution to the problem of drift is disclosed in my co-pending application Ser. No. 558,539, filed May 31, 1966, now Pat. No. 3,445,065. The solution disclosed therein is the mounting of the spray nozzle in a direction opposite to the direction of spray discharge. This tends to hold the freshly discharged stream a little longer essentially in a horizontal plane during the crucial early stages of drop formation, thereby maintaining laminar flow of the discharged droplets. The device of this invention is also used in the same manner as the device disclosed in my aforementioned application Ser. No. 558,539, now Pat. No. 3,445,065.

While the prior invention and the invention of this application are not to be limited to any particular theory of operation, it is believed that the forward component of nozzle movement interacts with the backward component of liquid discharge to exert a holding or drag upon the droplets in the early stage of droplet formation so that the primary droplet tends to crowd out or eliminate the satellite droplet. This phenomenon is shown in FIGS. 5 and 6 of my aforementioned application Ser. No. 558,539 as well as FIGS. 5 and 6 of the present application and is described with reference thereto.

Another way of considering this phenomenon is that the holding up action tends to cancel out the force that would produce the tail of the droplet or that the tail of the droplet is maintained within the primary droplet.

In any event, in the practice of the present invention the formation of tails is substantially eliminated, and in this way the formation of satellite droplets is substantially eliminated. The net result is the production of unusually uniform droplets in a spray operation. The combination of uniform droplet sizes plus the set of the nozzle orifice size to achieve droplets of desired size acts to produce a uniform spray pattern which essentially lacks fine droplets, and therefore the problem of drift is considerably minimized.

Another feature of the device of this invention is that due to the construction of the nozzles of the sprayer, there is an immediate cut off of liquid emanating from the nozzles when the supply of pressure to the liquid is terminated. In many prior art devices, the termination of liquid pressure would not effect an immediate cut off of liquid flow, and in many cases, liquid would continue to drop from the nozzles after the pressure supply was terminated. This additional dripping would compound the detrimental effect which occurred through the drift of herbicide, and therefore many economic crop areas would receive the unwanted herbicide.

Another problem present in many of the spray devices currently being used is the removal of liquid remaining in the nozzles after the pump pressure on the liquid has been terminated. Thus, even though there was an instantaneous cut off of fluid supply upon the termination of the pressure, there still remained a small amount of residue liquid within the spray nozzles.

This liquid would eventually be drawn to the tip of the nozzle through a venturi action of the air passing over the nozzles. At the tip, the liquid would form into small bubbles or droplets which would eventually fall off the nozzle tips. However, in many cases five to twenty seconds would lapse after cut off of the pressure before the bubbles or droplets would fall off the ends of the nozzles. By this time, the aircraft doing the spraying might be passing over areas in which herbicides could do serious harm, and even the few droplets falling over these areas could effect substantial damages.

Utilizing the device of this invention, there is an instantaneous stripping of all of the residue droplets from the nozzles, after cut off of the pressure has been effected.

It is therefore an object of this invention to provide a sprayer which will spray herbicides and other liquids in droplets of unusually uniform size, particularly from a moving object, such as a helicopter.

Another object of this invention is to provide a sprayer which will immediately terminate the discharge of liquid when the spraying operation is ceased.

It is a further object of this invention to provide a sprayer in which there is an instantaneous discharge of residue liquid from the spray nozzles at the time the spraying operation is ceased.

Yet another object is to provide a method of spraying that produces uniform droplets of a desired size.

The foregoing as well as other objects of the invention are achieved by providing a uniform spray device which basically involves means to feed a liquid to nozzles for discharge in laminar flow. The nozzles are pointed in a direction generally opposite to the direction of movement of the nozzle either in the air or along the ground. The liquid stream is discharged rearwardly and sufficiently away from the craft that the discharge is not impeded by air turbulence or low pressure air pockets. The liquid stream is instead influenced by the forward movement of the nozzles itself such that in the initial stage of droplet formation a holding-up action is exerted which substantially eliminates the formation of fine satellite particles.

Other objects of this invention are achieved by providing a sprayer comprising a hollow body, means for supplying a liquid to said hollow body, and a plurality of nozzles projecting from said hollow body, each of said nozzles comprising a capillary tube within said hollow body in fluid communication with said liquid and a spray tube coaxial with said capillary tube and projecting outwardly from said hollow body, said spray tube being in fluid communication with said capillary tube. The method of the present invention involves laminar flow and the relative movements as specified hereinabove.

In another aspect of this invention, there is provided a sprayer comprising a hollow body and a plurality of nozzles projecting outwardly from said hollow body, and adapted to dispense a liquid from said hollow body, and means contacting said nozzles adjacent the orifices thereof which is adapted to draw the residue liquid within said nozzles out of said nozzles after the spraying operation utilizing said nozzles has been completed, whereby said residue liquid will form droplets on said means, which droplets are adapted to be immediately dispensed from said means.

Other objects and many of the attendant advantages of this invention will be readily appreciated as the same becomes better understood by reference to the following detailed description when considered in connection with the accompanying drawings wherein:

FIG. 1 is a plan view of a helicopter equipped with the uniform sprayer of the present invention during an actual spraying operation;

FIG. 2 is a fragmentary enlarged perspective view showing a portion of the uniform sprayer of the present invention;

FIG. 3 is an enlarged sectional view taken along the lines 3—3 of FIG. 2;

FIG. 4 is a sectional view taken along the lines 4—4 of FIG. 3;

FIG. 5 is a schematic view showing drop formation in the case of the liquid being discharging in laminar flow from a stationary nozzle;

FIG. 6 is a view similar to FIG. 5 with the nozzle being moved in a direction opposite to the liquid discharged;

FIG. 7 is a perspective view of an alternate embodiment of the uniform sprayer of the present invention;

FIG. 8 is a somewhat enlarged sectional view taken along the lines 8—8 of FIG. 7;

FIG. 9 is a somewhat enlarged fragmentary sectional view taken along the lines 9—9 of FIG. 7;

FIG. 10 is a top plan view of a helicopter equipped with another type of liquid sprayer constructed in accordance with another embodiment of the present invention during an actual spraying operation;

FIG. 11 is an enlarged sectional view taken along the lines 11—11 of FIG. 10;

FIG. 12 is an enlarged partial sectional view of the nozzle end of the sprayer shown in FIG. 10;

FIG. 13 is a perspective view of the sprayer shown in FIG. 10;

FIG. 14 is an enlarged partial top plan view of the sprayer shown in FIG. 13, and showing the position of the residue liquid immediately after cessation of the spraying operation;

FIG. 15 is an enlarged sectional view taken along the lines 15—15 of FIG. 14;

FIG. 16 is a partial top plan view of the sprayer similar to that shown in FIG. 14, but showing the position of the residue liquid immediately after the cessation of the spraying operation when there is no wire present to withdraw the residue liquid from the spray nozzles; and FIG. 17 is an enlarged sectional view taken along the lines 17—17 of FIG. 16.

Referring now in greater detail to the various figures of the drawings wherein like reference characters refer to like parts, there is shown in FIG. 1 a plan view of a helicopter 10 equipped with a uniform sprayer 12 constituting a first embodiment of the present invention, shown during an actual spraying operation. Further details of the uniform sprayer 12 are shown in FIGS. 2, 3 and 4.

As best shown in FIGS. 2 and 3 the uniform sprayer 12 basically comprises intermediate line 14, discharge line 16 and discharge nozzles 18.

Liquid herbicide of water thin consistency or other liquid is fed from a source of supply carried by the helicopter 10 and fed to intermediate line 14 by gravity or pumping action, which ever is desired. The herbicide or other liquid travels from intermediate line 14 to discharge line 16 through connecting hardware including nipple 20 which connects female threaded opening 22 in the intermediate line 14 to L 24.

The connection between the L 24 and discharge line 16 is accomplished by virtue of specially designed nipple 26 which has a male threaded end 28 that is received by the L 24 and which has another male threaded end 30 which is received by appropriate threads in elongated body 32 which encloses the discharge line 16.

The actual liquid connection between the L 24 and the discharge line 16 involves port 34 in the nipple 26 which then merges into an outwardly tapering area 36 that becomes large open area 38 that runs for the remainder of the nipple 26. The liquid connection between nipple 26 and discharge line 16 is made through port 40 as indicated in FIG. 3. Fitted inside large annular area 38 is a spring 42 having one end 44 positioned adjacent port 40 and against body 32. The other end 46 of coil spring 42 rests against ball 48 which is positioned at least partially in the tapering area 36.

The ball 48 serves to provide an instant shut-off action whenever the fluid pressure is relieved as when a shut-off valve (not shown) is closed whenever it is desired to stop the spraying action. During the spraying action the liquid pressure works against the ball 48, and thus spaces it from the tapered sides defining tapering area 36 with the liquid pressure forcing the ball 48 to move against the bias of spring 42.

Hence, so long as the spraying operation continues, the liquid presure forces the ball 48 against the spring 42 and the liquid thereby can pass through the large open area 38 to the port 40 into discharge line 16 for spraying through nozzles 18 as will be discussed hereinafter.

The connection between the discharge line 16 and the nozzles 18 is also shown in FIG. 3 wherein a threaded end 52 of nipple 50 is directly screwed into a threaded opening in body 32. The other threaded end 54 of the nipple 50 is screwed into a connecting link 56 which has an opening to receive one end 58 of the L-shaped nozzle. A liquid tight connection is achieved by compression fittings in a manner well known to those skilled in the art.

As further shown in FIG. 3 the liquid connection between the discharge line 16 and the nozzle 18 is achieved by virtue of port 60 in the nipple 50 which widens somewhat in beveled area 62 to openings 64 which communicates directly with passage 66 in the nozzle 18. A ball 68 is provided which rests upon the tapered walls comprising beveled area 62. The ball 68 also serves substantially to eliminate dripping when the fluid pressure is shut-off. The ball 68 is similar in operation to the ball 48 and the ball 68 may be either spring actuated or gravity actuated.

It is seen that when the liquid pressure is turned on the ball 68 will be moved upwardly from the beveled surface 62 in order to permit liquid discharge. However, as soon as the liquid pressure is turned off the ball 68 will return to the position of FIG. 3 either under spring action or by virtue of gravity and thereby prevent further liquid escape.

The liquid pressure is to be so adjusted, taking into account the size of the openings 66 in the nozzle 18 that the herbicide or other liquid discharge from the nozzle 18 will be in laminar flow as the concept of laminar or streamline flow is known to those skilled in the art. See Chemical Engineers' Handbook (John Perry, McGraw-Hill 1950), page 375. It is preferable that spray discharges be clear so that all turbulence is absent. It is to be recognized that where the turbulent flow range is approached the presence of swirls of turbulence in the transition range may start to promote the formation of fine particles by virtue of satellite formation or other complex stresses which tend to introduce a disturbing effect into the spray pattern.

As shown in FIG. 3 the discharge opening 70 of the nozzle 18 points leftwardly or in a rearward direction. Thus, with the operation of the present invention the nozzle 18 would be moved forwardly or to the right as observed in FIG. 3. The actual operation can be understood by a consideration of FIGS. 5 and 6 of the drawing.

A stationary nozzle 18 is shown in FIG. 5 with the herbicide or other liquid emerging therefrom in laminar flow. FIG. 5 shows satellite formation. It is thus seen from FIG. 5 that the droplets formed from the emerging stream tend to subdivide into a primary droplet and a small droplet which forms generally behind the primary droplet. In observing FIG. 5 it will be seen that droplet 72 is representative of a spherical configuration possessed by a primary droplet immediately upon formation. Droplet 74 shows the initiation of a backward stretching action which becomes more pronounced in droplet 76 as the vertical component of fall becomes more prominent and the horizontal component of spray discharge becomes less significant. With droplet 78 a definite tail 80 has formed.

With further fall and lateral movement, the stretching action continues until the tail 80 is practically a separate entity in droplet 82, and in droplet 84 the tail 80 has become a satellite particle 86. It is, of course, possible for more than one satellite droplet to form from a primary droplet, and it is even conceivable that the satellite particles themselves may further divide into sub-satellite particles.

The operation of the present invention is schematically shown in FIG. 6 wherein the spray discharge is in the rearward direction of arrow 88 with the nozzle 18 being moved forwardly in the direction of arrow 90. Thus, in FIG. 6 the laminar discharge is being propelled in a direction substantially opposite to the direction of nozzle movement. This is believed to hold the freshly discharged stream a little longer essentially in a horizontal plane during the crucial early stages of drop formation.

While the invention is not to be limited to any particular theory of operation, it is believed that the forward component of nozzle movement in the direction of arrow 90 interacts with the backward component of liquid discharge in the direction of arrow 88. The net result is believed to exert a holding or drag upon the droplets 92 so that the primary drop will tend to crowd out, swallow up or otherwise eliminate the satellite drop. Another way of considering this phenomenon is that the holding up action tends to cancel out the forces which would produce the tail of the droplet or that the tail of the droplet is maintained within the primary drop.

The present invention has been tested in actual helicopter flight and has produced unusually uniform droplet patterns. While reliance upon laminar flow necessarily limits pumping speed, spraying capacity is not adversely affected because it is a simple matter to widen the span or increase the number of spray banks. In view of the importance of maintaining the spray pattern, it is preferred that the spray nozzles be secured as remote as possible from the helicopter propellers. For instance, spray nozzles in accordance with the invention have been successfully secured upon the skids of the helicopter.

As shown in FIG. 2 the intermediate line 14 is closed off at the ends thereof by means of a cap 94 with the herbicide or other liquid thereby being forced into discharge line 16. It is to be noted that the intermediate line 14 serves to balance out the usual pressure drop which is encountered with series feeding. In other words, if one end of the discharge line was directly fed, the more remote nozzles would be under lower liquid pressure than the upstream nozzles. This would have the effect of producing a variable spray pattern. With the present invention it is desirable that the spray pattern be uniform across all of the nozzles, and this is achieved through the use of the intermediate line 14 which eliminates the loss of head in the end nozzles. Thus, liquid pressure for all of the nozzles 18 is substantially equal.

With reference to FIG. 1 it can be seen that the discharge stream will be initiated at a point that is sufficiently away from any portion of the helicopter or other motivating device so that the discharge stream is not impeded by any air turbulence or low pressure air pockets that are created as the helicopter travels through the air or a craft moves along the ground. It can be seen that the turbulent effect of the air currents or air pockets would impose a destructive force on the droplets that have been so carefully formed in accordance with the present invention, such that the carefully formed droplets would be caused to fly apart and thereby create undesirable fine droplets.

Figure 8:
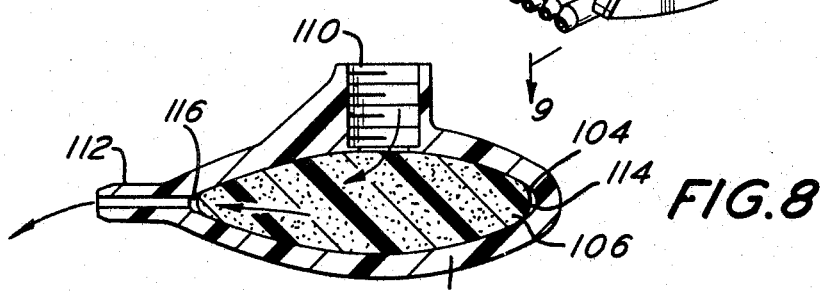
Figure 9:
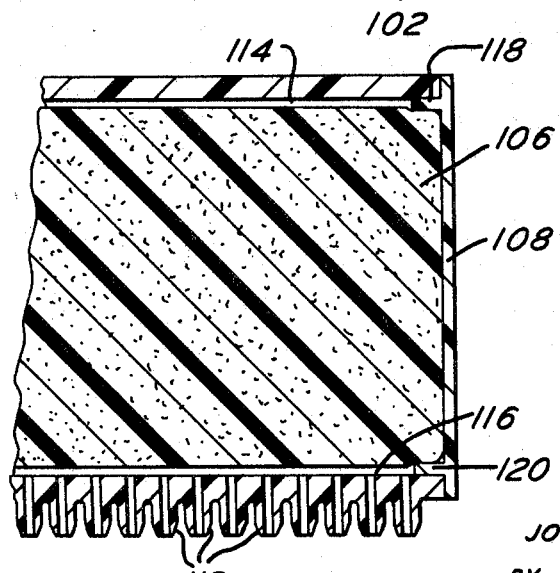

A second embodiment of the sprayer of the present invention is shown in FIGS. 7, 8 and 9 in uniform sprayer 100 which is comprised of a generally elliptical body section 102 in airfoil form. For this reason, the sprayer 100 can contribute somewhat of a lift in aerial operations.

As shown in FIG. 8 the body section 102 possesses a generally hollow space 104 which is essentially occupied by a sponge 106 or other absorbent material. The body section 102 is closed off at the ends thereof by caps 108.

The body section 102 further includes an entrance port 110 which is internally threaded in order to be connected preferably to a feeder line or hose which may or may not be designed along the lines of intermediate line 14. The body section 102 also possesses a plurality of discharge nozzles 112 as shown in FIGS. 7, 8 and 9.

As also shown in FIGS. 8 and 9 the sponge or absorbent material 106 substantially fills the internal space 104 with the possible exception of a rear area 114 and a forward area 116 that is adjacent the nozzle 112. The areas 114 and 116 are created through the action respectively of flanges 118 and 120 that are integral with cap 108 as shown in FIG. 9.

In operation the herbicide or other liquid is fed into the body 102 by attachment of the supply source to entrance port 110. The herbicide or other liquid passes downwardly in the direction of the arrows of FIG. 8 into the sponge or absorbent material 106 and then upwardly to be discharged through the nozzle 112 in laminar flow. The actual flow rate is again a product of the cross-sectional area of the openings of the nozzle 112 and the liquid pressure.

It is seen that whenever the liquid pressure is turned off that the absorptive properties of material 106 will hold substantially all liquid within the space 104 and prevent the same from dripping. Should it be desired to replace the absorptive material 106, it is a simple matter to remove one or both of the end caps 108 and replace the absorptive element. It is also to be noted that the absorptive element will equalize pressure of liquid that is being fed to the nozzles 112 and thereby assure further uniformity of spray discharge.

It is thus seen that the present invention provides an effective solution to the problem of drift since the droplets produced thereby are substantially uniform. The method of the present invention involves spraying of liquid in laminar flow from a nozzle which is being simultaneously moved in a direction substantially opposite to the direction of spray discharge as will be discussed hereinafter.

Two forms of the apparatus of the present invention have been disclosed so far and the second form of which lacks springs, ball valves or other movable devices for substantially eliminating dripping when the supply valve has been shut off. It is to be emphasized that dripping in itself can cause problems because the powerful properties of a systemic herbicide are such that significant damage could be inflicted by accidental dripping in unwanted area.

Furthermore, in all embodiments of the invention, the forward speed of the helicopter will generally exceed the backward speed of nozzle discharge. This also has the effect of crowding out or eliminating the formation of satellite particles.

Referring now in greater detail to FIGS. 10 to 17, there is shown in FIG. 10 a plan view of a helicopter 130 and a spray boom 132 including another modification of the sprayer of the present invention.

Spray boom 132 is secured on the landing skids of the helicopter at the front thereof. The spray boom comprises a first line 134, a second line 136 and a plurality of sprayers 138. Lines 134 and 136 are in fluid communication with each other through bridging lines 140.

Figure 13:
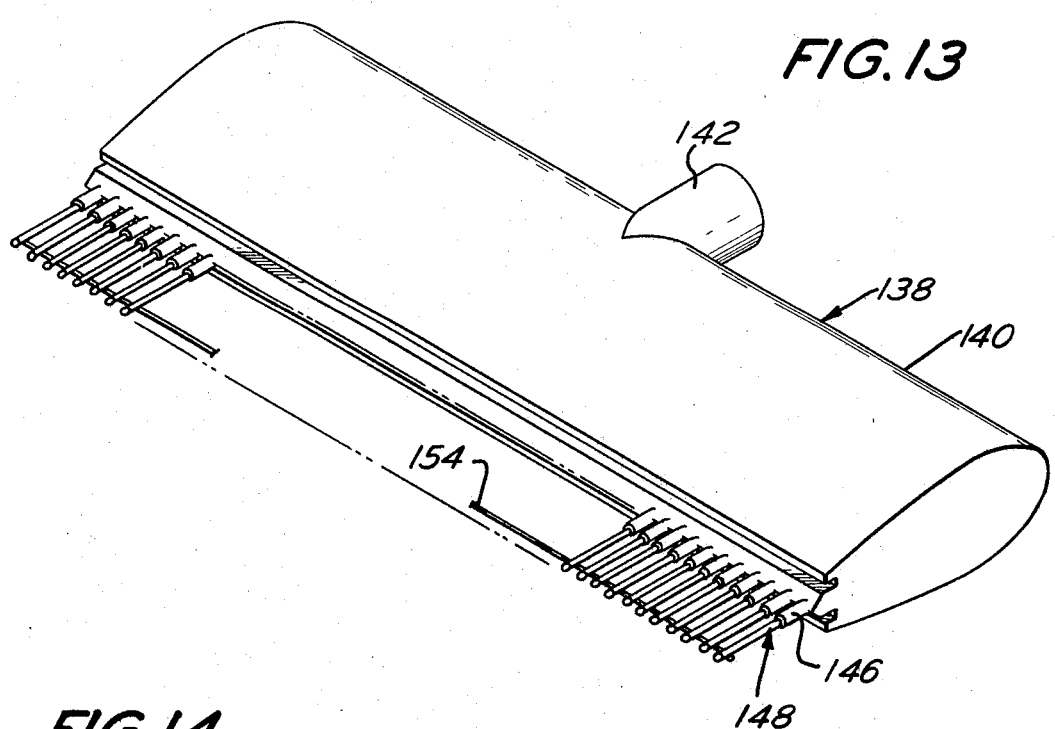
Figure 14:
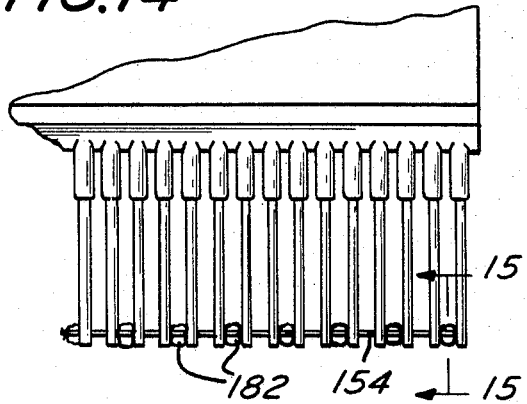
Figure 15:
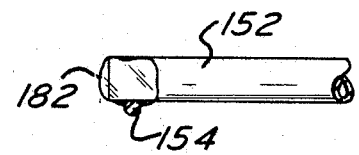
Figure 16:
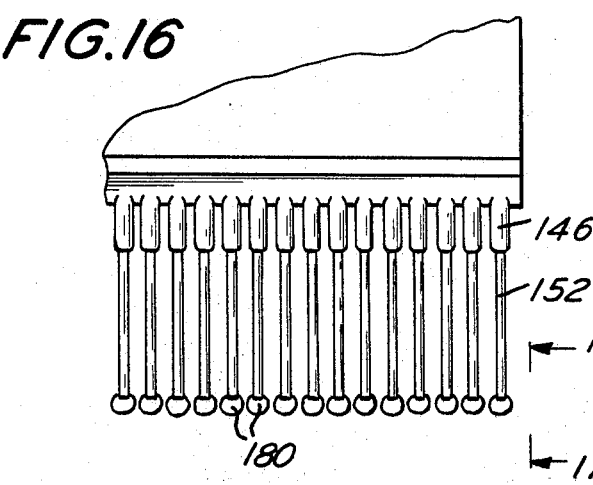
Figure 17:
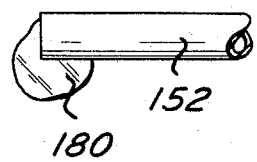

The sprayer 138 is generally shown in FIG. 13. The sprayer includes a hollow elliptical body 140 which generally has the shape of an airfoil. The body includes a sleeve 142 which is unitary with the interior of the body 140, as seen in FIG. 11. Body 140 is provided with a pair of parallel notches 144 along one edge. The notches are an optional feature, and may be omitted, as will be explained hereinafter. A plurality of parallel nibs 146 projects from the edge of body 140. Nibs 146 are unitary with body 140 and have a hollow bore in fluid communication with the interior of the hollow body, as seen in FIGS. 11 and 12.

Nibs 146 form a part of nozzles 148 of the spray device. The nozzles 148 also include capillary tubes 150 and spray tubes 152. As best seen in FIGS. 11 and 12, capillary tubes have one end positioned within the interior of hollow body 140. The tubes are secured in nibs 146 by a pressed fit. Spray tubes 152 are telescoped over tubes 150 at the front thereof and are coaxial therewith. Tubes 152 are secured on tubes 150 by a pressed fit.

A fine wire 154 is secured adjacent the orifices 156 of spray tubes 152. As best seen in FIG. 12, the wire is positioned on the underside of spray tubes 152. It has been found that in order to secure the wire in place, it is not necessary to secure it to each of the spray tubes 152, but securement at the outermost spray tubes and a number of intermediate spray tubes by solder 158 is sufficient to maintain the wire in place.

Sprayers 138 are secured on fluid lines 136. This is accomplished by coupling valves 160 to tubes 162 and sleeves 142 of the sprayers. As seen in FIG. 11, tubes 162 are welded to lines 136, as shown at 164 in FIG. 11, and are in fluid communication therewith. Valves 160 include an externally threaded sleeve 166 which is threadedly secured in sleeve 142 of the sprayer 138. A lock nut coupling comprising an internally threaded nut 168 and an externally threaded nut 170 couples sleeve 166 with tube 162. An O-ring 172 provides a liquid tight seal between nut 170 and sleeve 166. Nut 168 is also provided with internal gasketing to prevent any leakage between the nut and tube 162. A valve disk 174 mounted on a spring loaded stem seals sleeve 166, the end of which serves as a valve seat. An O-ring 176 is used in conjunction with the valve disk 174 to provide an effective seal.

Valve 160 is a spring loaded diaphragm valve. The valve opens by the movement of valve disk 174 and its associated O-ring 176 to the left, as viewed in FIG. 11. The valve disk is caused to move by pressure against a diaphragm with the valve 160. This pressure is caused by liquid pressure within the fluid lines 134 and 136. Immediately upon the termination of the liquid pressure, the spring within valve 160 returns the valve disk 174 to the position shown in FIG. 11, thereby preventing any further flow of liquid.

The specific valve used with this invention forms no part of the invention, and any liquid valve can be used. The valve described herein is basically that shown in my co-pending application Ser. No. 627,550, filed Mar. 31, 1967. Another valve which may be used is that described above with respect to FIG. 3. However, any liquid flow control valve known to the art can be used in carrying out the invention of this application.

The purpose of having lines 134 and 136 for supplying liquid to the sprayers 138 is to balance out the usual pressure drop which is encountered with series feeding. In other words, as pointed out above, if one end of the discharge line was directly fed, the more remote nozzles would be under lower liquid pressure than the upstream nozzles. This would have the effect of producing a variable spray pattern. With the present invention it is desirable that the spray pattern be uniform across all of the nozzles, and this is achieved through the use of the lines 134 and 136, which eliminates the loss of head in the remote nozzles. Thus, liquid pressure for all of the nozzles is substantially equal. Details of the use of the dual feed lines 134 and 136 are disclosed in my co-pending application Ser. No. 607,488, filed Jan. 5, 1967, now Pat. No. 3,410,489.

The boom 132 also includes mounting flanges 178 which are generally elliptical in shape, as seen in FIG. 11. Flanges 178 are provided with a plurality of holes 180. One of the purposes of flanges 178 is to provide for the coupling of the sections of boom 132. Thus, the boom 132 comprises a plurality of sections of lines 134 and 136 and their associated sprayers 138, and in use, the various sections are coupled together through the use of mounting flanges 178 and suitable gasketing. The mounting flanges are used for providing a support for an optional metal covering which is placed over the entire boom 132. The covering will be elliptical in shape, basically conforming to the shape of flanges 178, and will have turned-in edges which are received in notches 144. Details of the covering are disclosed in my aforementioned co-pending application Ser. No. 627,550. This is purely an optional feature, and it has been found that the device of this invention will be completely effective without the use of the covering.

One of the features of this invention is the use of the capillary tubes 150. As used heerin, capillary tubing is tubing having a sufficiently small diameter and a sufficiently great length to prevent the passage of liquid therethrough at atmospheric pressure. In other words, even though hollow body 140 may be filled with liquid, the liquid will not pass through tubes 150 unless there is a positive pressure placed on the liquid, as by a liquid pump. Having the capillary tubes 150 will therefore provide an instantaneous shut off of liquid flow from sprayer 138 when the pumping operation is ceased. In many prior art devices, when the spraying operation was ceased a portion of the liquid remaining in the spray chamber would still flow from the spray chamber. As pointed out above, serious damage could result by the discharging of herbicides over areas containing economic crops when such discharge was undesired.

The spray tubes 152 have an internal diameter which is greater than the internal diameter of capillary tubes 150. The internal diameter of the spray tubes 152 is preferably the largest diameter which will produce a stable droplet during the spraying operation. Thus, when small diameter droplets are formed, they are sufficiently stable to retain their spheroid shape during the entire time between leaving the nozzle and being deposited on the crops being sprayed. However, because of the problems of drift, it is desired to have the droplet size as large as possible. But, as the droplet size is increased, the possibility of droplet dissociation increases, and the net result could be the breaking up of the large droplet, with the ultimate production of small satellite droplets which tend to drift. Therefore, the optimum internal diameter of spray tube 152 is that which will produce the largest stable droplet during the spraying operation. This diameter will vary depending upon wind conditions, flight pattern, the angle of the sprayer relative to the horizontal, and other variables normally encountered in a spraying operation.

By way of specific example, capillary tube 150 can have an internal diameter of 0.018 inch and a length of 2 1/16 inch, as a capillary tube of these dimensions will produce a resistance great enough to prevent water and oil/water emulsions from flowing at atmospheric pressure. Within limited dimensions, the larger the internal diameter of the capillary tube, the longer the tube must be. In designing the tube, consideration must also be given to the fact that when the helicopter carrying the sprayer is banked, liquid within the sprayer, even though originally at atmospheric pressure, will produce a head of pressure at one end of the sprayer, thereby increasing the liquid pressure within the capillary tube. Therefore, a factor of safety should be included in designing the capillary tube to insure that there will be no liquid flow at pressures slightly greater than atmospheric. Thus, the tube design should be such as to permit liquid flow only when there is a positive pressure applied to the liquid by a pump.

By way of specific example, the internal diameter of the spray tube 152 can be 0.028 inch. This diameter will produce a stable droplet of water or oil and water at an aircraft speed of thirty to fifty miles per hour, which is in the operating range desired. An orifice any larger than this, operating at these designated forward speeds, could produce a droplet of sufficient size that the existing turbulence might break it into smaller droplets. Of course, it is to be understood that a droplet of larger diameter would remain stable under less severe conditions, such as reduced turbulence and lower velocity.

Another factor to be considered is the length of the spray tube. When the liquid leaves the capillary tube and enters the larger diameter spray tube, there is a decrease in velocity of the liquid. This creates a low pressure area where the diameters change, which in turn creates a local turbulence which must be smoothed to laminar flow before the stream is released to the atmosphere. A length ratio between the capillary tube and spray tube of about 2:1 will normally be sufficient to overcome the turbulence. Thus, in carrying out the design of the device of this invention, all that is necessary is that the spray tube have the proper dimensions to produce a stable droplet and that the capillary tube have the proper dimensions to produce the required resistance to liquid flow at atmospheric pressure.

After the pressure of the pump has ceased, no further liquid will pass through tubes 150 and 152. However, there is a residual amount of liquid remaining in tube 152 and at its orifice when the spraying operation has ceased. The action of the wind passing over the ends of the tubes draws a vacuum on the tubes, in the nature of a venturi effect. This brings the residue liquid within the tubes 152 to the orifice, where it collects as a droplet, as shown at 180 in FIGS. 16 and 17. At a forward speed of 35 miles per hour, it takes from 5 to 20 seconds after cut-off of pressure to strip droplets 180 from the ends of tubes 152. During this 5 to 20 second period, the helicopter may be flying over economic crops, and the depositing of these droplets on the economic crops can cause serious harm.

The device of this invention solves the problem of the delayed stripping of the residue liquid from the spray tubes. Thus, wire 154 serves the function of immediately drawing the residue liquid from the tubes 152 and forming the liquid into large droplets 182 along the wire and between the tubes 152. Immediately after the droplets 182 are formed, they are instantaneously stripped from the wire 154. Thus, the residue liquid within tubes 152 is instantaneously stripped from the tubes, and the damage which resulted from the delayed stripping is prevented.

The exact method by which wire 154 performs this function is not known, but it is believed that the wire acts to draw out the residue liquid from adjacent spray tubes. The surface tension of the liquid causes the liquid to coalesce on the wire into relatively large, strippable droplets which are immediately removed from the wire by the high speed air passing over the wire. Furthermore, the droplets 182 on the wire are completely exposed to the wind, whereas the droplets 180 at the orifices are partially protected from the wind by the orifices, thereby making it more difficult to dislodge them.

As explained above, the spray nozzles 148 face in a direction generally opposite to the direction of travel of the helicopter. This aids in maintaining stable droplets during the spraying operation. It has also been found that in many instances, it is advisable to have the spray tubes 152, and thus the trailing edge of sprayers 138, pointing slightly downward with respect to the relative wind. Thus, in some instances, it may be advisable to having the trailing edge of the sprayers 138 angled downwardly approximately 10°. However, this angle is solely approximate, and will vary depending upon wind currents, turbulence, helicopter speed, and the other variables which must be taken into consideration in setting sprayer angle.

One of the advantages of the sprayer of this invention over the sprayer disclosed in FIGS. 7, 8 and 9 is that under certain operating conditions, the foam insert would collapse, thereby impeding further spraying. This could only be caused during the use of extremely high pressures for the sprayed liquid. However, utilizing the same pressures with the device of this invention, there is no problem of reduced or impeded flow.

The wire 154 serves a second function in addition to its primary function of stripping the residue liquid from the spray tubes. Thus, during take off and landing of the helicopter, quite often the helicopter will go in a rearward direction. Since the spray boom is located on the helicopter skids, it will contact the grass where the helicopter is landing or taking off. The spray tubes 152 act like a comb in passing through the grass, and thus are prone to collecting large amounts of grass between them. However, with the wire 154 secured in place, this combing or raking action is prevented, and therefore no grass, which would impede liquid flow, will be accumulated.

The sprayer of this invention can be made from any rigid material, such as metal or natural or synthetic resin. The one requirement is that the material be resistant to the herbicide liquid being sprayed. Thus, the sprayer housing 140 can be made of stainless steel or polyethylene. Tubes 150 and 152 are stainless steel.

From all of the foregoing, it can be seen that the various embodiments of the spray means of the present invention each involve discharge of liquid in laminar flow. Such a discharge occurs in such a way that the resulting spray patterns is not distorted by air turbulence or low pressure air pockets. This is preferably accomplished by having the discharge occur at a point sufficiently removed from the structure of the vehicle upon which the spray device is mounted. For instance, where a helicopter is used the spray pattern should be initiated at a point sufficiently remote from any struts, and if the spray device is mounted on an airplane then the spray discharge should be initiated at a point sufficiently away from any wing structure.

In accordance with the present invention the discharge openings may be made larger or smaller, either by appropriate sizing of the parts or through the use of a variable opening. In this way, larger droplets, which have less of a tendency to drift, will be produced.

Without further elaboration the foregoing will so fully illustrate my invention that others may, by applying current to future knowledge, readily adapt the same for use under various conditions of service.

What is claimed as the invention is:

1. A sprayer comprising a hollow body, supply means for supplying liquid under pressure to said hollow body, and a plurality of closely packed nozzles projecting from said hollow body, each of said nozzles comprising a capillary tube within said hollow body in fluid communication with said liquid and projecting outwardly from said hollow body, said capillary tube having a sufficiently minimal interior cross-sectional area and being of sufficient length to prevent flow of residual liquid through said capillary tube when said supply means are closed, with said liquid pressure being sufficiently great when said supply means are open that said liquid is discharged from said nozzles in laminar flow and not in turbulent flow, whereby said liquid is discharged from said closely packed nozzles to produce a uniform pattern of stable droplets.

2. The invention of claim 1 wherein said liquid is discharged in a first direction, said sprayer being mounted on a vehicle, means to move said vehicle and said sprayer in a direction substantially opposite to said first direction.

3. The invention of claim 2 wherein said sprayer is secured to a moving helicopter, and said hollow body is airfoil shaped.

4. The invention of claim 3 wherein said liquid is discharged in a rearward sense and said nozzle is moved in a forward sense by said vehicle at a speed greater than the speed of rearward discharge of said stream.

5. The invention of claim 3 including shut-off means associated with said supply means to close said supply means upon release of liquid pressure thereto.

6. The invention of claim 3 wherein said discharge opening may be varied in size in order to change the size of said uniform droplets which form from said stream.

7. The invention of claim 3 including a spray tube coaxial with said capillary tube and projecting outwardly from said hollow body, said spray tube being in fluid communication with said capillary tube and said spray tube having an orifice at one end thereof, with the other end of said spray tube being telescoped over said capillary tube, and a portion of said spray tube and a portion of said capillary tube being co-extensive.

8. The invention of claim 1 wherein said hollow body is a sprayer, there being a plurality of such sprayers removably secured to a spray boom.

9. A sprayer comprising a hollow body, means for supplying liquid to said hollow body, and a plurality of nozzles projecting from said hollow body, each of said nozzles comprising a capillary tube within said hollow body in fluid communication with said liquid and a spray tube coaxial with said capillary tube and projecting outwardly from said hollow body, said spray tube being in fluid communication with said capillary tube and said spray tube having an orifice at one end thereof, with the other end of said spray tube being telescoped over said capillary tube, and a portion of said spray tube and a portion of said capillary tube being co-extensive.

10. The invention of claim 9 wherein said capillary tube has an internal diameter sufficiently small and a length sufficiently great to prevent the passage of liquid therethrough at atmospheric pressure.

11. The invention of claim 10 wherein said spray tubes have an internal diameter which is greater than the internal diameter of said capillary tubes, with the internal diameter of the spray tubes being sufficiently small to produce a stable droplet when a liquid is sprayed through said spray tubes.

12. The invention of claim 9 wherein said spray tubes have discharge orifices at one end thereof, and further including means contacting said spray tubes adjacent the orifices thereof, said contacting means being adapted to draw the residue liquid within said spray tubes out of said spray tubes after the spraying operation utilizing said spray tubes has been completed, whereby said residue liquid will form droplets on said contacting means, which droplets are adapted to be immediately dispensed from said contacting means.

13. A sprayer comprising a hollow body and a plurality of nozzles projecting outwardly from said hollow body and adapted to dispense a liquid from said hollow body through orifices, each of said nozzles including a tube, with said contacting means contacting said tubes, said contacting means comprising a wire contacting said tubes and being adapted to draw the residue liquid within said nozzles out of said nozzles after the spraying operation utilizing said nozzles has been completed, whereby said residue liquid will form droplets on said contacting means, which droplets are adapted to be immediately dispensed from said contacting means.

14. The invention of claim 13 wherein said wire is secured to a plurality of said tubes.

15. The invention of claim 13 wherein the orifices of said tubes are aligned, and said wire is parallel to said orifices.

References Cited

UNITED STATES PATENTS

| | | | |
|---|---|---|---|
| 3,084,890 | 4/1963 | Hyde | 239—171 |
| 3,189,223 | 6/1965 | Mackal | 222—420 X |
| 3,191,866 | 6/1965 | Wilson | 244—136 X |
| 3,197,299 | 7/1965 | Stull et al. | 239—171 X |
| 3,337,096 | 8/1967 | Brown | 222—380 |
| 3,341,124 | 9/1967 | Barnes | 239—8 |
| 2,979,273 | 4/1961 | Liebhart | 239—171 |
| 3,061,247 | 10/1962 | Hyde | 239—171 |
| 3,445,065 | 5/1969 | Waldrum | 239—171 |

EVERETT W. KIRBY, Primary Examiner

U.S. Cl. X.R.

222—380; 239—8; 244—136